US008820818B2

(12) United States Patent
Beumer

(10) Patent No.: US 8,820,818 B2
(45) Date of Patent: Sep. 2, 2014

(54) VEHICLE WITH TILT CAB

(75) Inventor: Jan Albertus Beumer, Lochem (NL)

(73) Assignee: Actuant Corporation, Menomonee Falls, WI (US)

(*) Notice: Subject to any disclaimer, the term of this patent is extended or adjusted under 35 U.S.C. 154(b) by 337 days.

(21) Appl. No.: 13/090,829

(22) Filed: Apr. 20, 2011

(65) Prior Publication Data
US 2011/0266834 A1 Nov. 3, 2011

(30) Foreign Application Priority Data

May 3, 2010 (NL) ...................................... 2004647

(51) Int. Cl.
B62D 33/067 (2006.01)
B62D 21/15 (2006.01)
F15B 20/00 (2006.01)
F15B 15/20 (2006.01)

(52) U.S. Cl.
CPC .............. B62D 33/067 (2013.01); B62D 21/15 (2013.01); F15B 20/007 (2013.01); F15B 15/204 (2013.01)
USPC ....................................... 296/190.05; 91/422

(58) Field of Classification Search
USPC ............ 296/190.01, 190.03, 190.05, 190.06; 293/133, 134; 180/89.15; 92/422, 92/181 R; 91/422
IPC ..................................................... B62D 33/067
See application file for complete search history.

(56) References Cited

U.S. PATENT DOCUMENTS 2,967,511 A * 1/1961 Geyer ............................. 91/416
3,853,368 A 12/1974 Eichelsheim
(Continued)

FOREIGN PATENT DOCUMENTS

EP 0939027 A2 9/1999
EP 1099857 A1 5/2001
(Continued)

OTHER PUBLICATIONS

EP2187066 (cited by applicant) machine translation.*
(Continued)

Primary Examiner — Pinel Romain
(74) Attorney, Agent, or Firm — Michael Best & Friedrich LLP

(57) ABSTRACT

A vehicle comprises a chassis and a tilt cab which is mounted to said chassis and is tiltable with respect to the chassis. The vehicle furthermore comprises a tilting system for tilting said tilt cab relative to the chassis between a lowered position and a raised position. The tilting system comprises a reservoir for hydraulic fluid, a pump and at least one double-acting hydraulic tilt cylinder having a push chamber and a pull chamber. The cylinder has a movable piston and piston rod assembly, wherein the piston separates the push chamber and the pull chamber. The cylinder is connected to the chassis and to the cab, such that when hydraulic fluid is supplied to the push chamber the cab moves to the raised position and when hydraulic fluid is supplied to the pull chamber the cab moves to the lowered position. The tilting system furthermore comprises a control valve, which in a first position connects the pump to the push chamber of the cylinder and connects the reservoir to the pull chamber, and in a second position connects the pump to the pull chamber of the cylinder and the reservoir to the push chamber. The tilt cylinder has a safety release device, which releases pressure from the pull chamber side to the push chamber side of the tilting system, in the event that the cab is in the lowered position and the pressure in the pull chamber exceeds a predetermined threshold pressure.

26 Claims, 5 Drawing Sheets

(56) References Cited

U.S. PATENT DOCUMENTS

| | | | | |
|---|---|---|---|---|
| 4,446,939 A | * | 5/1984 | Oudelaar | 180/89.15 |
| 4,556,118 A | * | 12/1985 | London | 180/89.15 |
| 5,325,763 A | * | 7/1994 | Foster | 91/422 |

FOREIGN PATENT DOCUMENTS

| | | |
|---|---|---|
| EP | 2187066 A1 | 5/2010 |
| FR | 2417663 A1 | 9/1979 |
| WO | 99/45280 | 9/1999 |

OTHER PUBLICATIONS

European Patent Office; Search Report of corresponding Dutch Application No. 2004647; dated Dec. 16, 2010.

\* cited by examiner

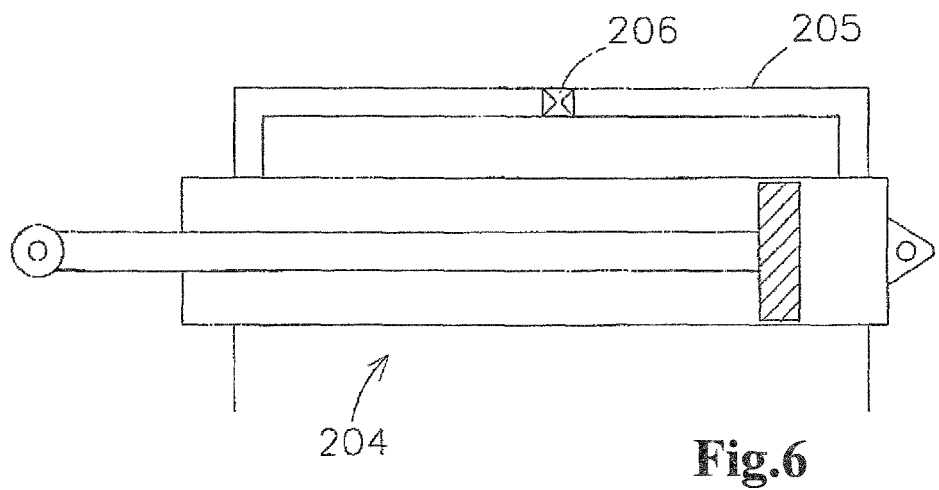
Fig.6
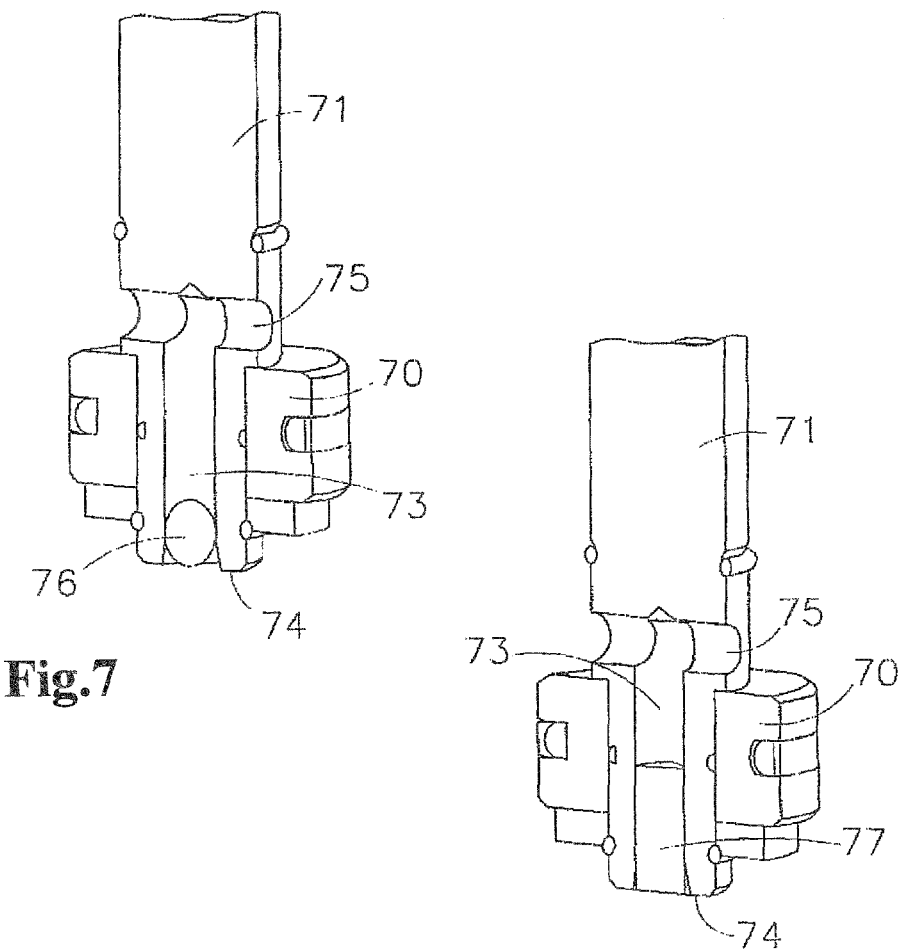
Fig.7
Fig.8

VEHICLE WITH TILT CAB

BACKGROUND OF THE INVENTION

The present invention relates to a vehicle comprising a chassis and a tilt cab which is mounted to said chassis and is tiltable with respect to the chassis. The vehicle furthermore comprises a tilting system for tilting said tilt cab relative to the vehicle chassis back and forth between a lowered position in which the vehicle can be driven and a raised position in which, for example, maintenance work can be carried out on the engine which lies beneath the cab. The tilting system comprises a reservoir for hydraulic fluid, a pump and at least one double-acting hydraulic tilt cylinder. The tilt cylinder has a push chamber and a pull chamber and a movable piston and piston rod assembly. The piston separates the push chamber and the pull chamber. The hydraulic cylinder is connected to the chassis and to the cab, such that when hydraulic fluid is supplied to the push chamber the cab moves to the raised position and when hydraulic fluid is supplied to the pull chamber the cab moves to the lowered position. The tilting system also comprises a control valve, which in a first position connects the pump to the push chamber of the cylinder and connects the reservoir to the pull chamber, and in a second position connects the pump to the pull chamber of the cylinder and the reservoir to the push chamber.

Such a vehicle is known.

When the known vehicle, during an accident, has a frontal collision with another vehicle or other object, the front of the cab is pushed in a rearward direction with respect to the chassis. The tilt cylinder however, which in the lowered position of the cab is pressurised in the pull chamber, withholds the cab from moving rearwardly with respect to the chassis, at least at the location where the cylinder is mounted to the cab. As a result the cab is crushed. In the past several heavy injuries of the driver have occurred because of the cab crushing during a frontal collision.

The present invention has for an object to provide a safer vehicle which causes less heavy injuries to the driver during frontal collisions.

SUMMARY OF THE INVENTION

This object is achieved by a vehicle of the type described at the outset, wherein the tilt cylinder has a safety release device, which releases pressure from the pull chamber side to the push chamber side of the tilting system, in the event that the pressure in the pull chamber exceeds a predetermined threshold pressure.

During a collision, the cab is in the lowered position and the front of the vehicle cab is pushed in a rearward direction. Thereby the cab pulls on the tilt cylinder whereby the pressure of the hydraulic fluid in the pull chamber of the tilt cylinder raises quickly. When the pressure in the pull chamber exceeds the threshold pressure, the safety release device releases the pressure from the pull chamber into the push chamber such that the piston/piston assembly can move. Thereby, when a frontal collision occurs, the cab is allowed to be pushed in a rearward direction in its entirety. Crushing of the cab is reduced such that the chances of the driver being severely injured are reduced.

In a preferred embodiment the safety release device includes a release passage extending between the pull chamber and the push chamber, in which release passage a pressure removable element, preferably a rupturable element, is arranged, wherein the release passage brings the pull chamber in fluid communication with the push chamber when the rupturable element is ruptured.

In a further preferred embodiment the release passage is incorporated integrally in the tilt cylinder, wherein, more preferably the release passage extends through the piston/piston rod assembly. This provides a reliable safety release device which does not occupy additional space in the vehicle.

Furthermore the safety release device incorporated in the piston/piston rod assembly provides the advantage that the design of existing cylinder bodies does not have to be modified.

Also, incorporating the release passage in the piston/piston rod assembly, results in a relatively short release passage between the pull chamber and the push chamber. This has the advantage that it has a limited hydraulic resistance, whereby, in case of a collision when the pressure removable element is removed, a build up of pressure in the relief passage is prevented and the relief system has a short reaction time.

In a further preferred embodiment an axial through bore is provided in the piston, in which through bore an end portion of the piston rod is inserted, the end portion of the piston rod is provided with an axial bore, which extends from the piston rod end surface, and the piston rod is provided with at least one radially extending bore which extends from the outer surface of the piston rod to said axial bore of the piston rod, wherein the axial bore in the piston and the axial and radial bore in the piston rod define the release passage.

Preferably a shoulder is formed in the bore in the piston, the rupturable element rests with one side thereof against said shoulder, and the end surface of the piston rod rests against the opposite side of the rupturable element, such that the rupturable element is confined between the shoulder and said end surface of the piston rod.

More preferably, the rupturable element comprises a bushing, wherein at either end of the bushing a rupturable disc is arranged. The rupturable disc on the push side can withstand the pressure in the push chamber under normal operation conditions while the cab is moved to the raised position. The rupturable disc on the pull side can withstand the pressure in the pull chamber under normal operation conditions while the cab is moved to the lowered position.

Preferably the rupturable element is symmetrical such that it has the same dimensional and operational properties towards two directions. The symmetrical construction has the advantage that the rupturable element can be installed in the cylinder either way without leading to a disfunctioning and thus a potentially dangerous failure of the safety release device.

In one possible embodiment, the rupturable discs both have a dome shaped central portion with a convex side and a concave side, wherein the dome shaped portions of the rupturable discs are facing each other with the convex side thereof. When during a collision of the vehicle the pressure in the pull chamber exceeds the threshold pressure of the pull sided rupturable disc, this disc will rupture and instantly thereafter the dome shape of the push sided disc will invert its dome shape due to the pressure and will rupture as well.

Each rupturable disc of the rupturable element in normal operation shields the other rupturable disc from pressure from the other side of the piston. Thus the push sided disc prevents under normal operation that the pull sided disc is loaded with pressure from the push chamber and the pull sided disc prevents under normal operation that the push sided disc is loaded with pressure from the pull chamber. The space between the two rupturable discs is substantially pressureless in normal operation.

Preferably, the bushing has an inner surface and an end face on either end, wherein an edge is present between each end face and the inner surface, each edge having a rounded shape with a certain radius, which is such that under normal operation conditions for tilting the cab the rounded edges support the respective rupturabe discs, and wherein the radius on the pull sided edge of the bushing is such that it ruptures the pull sided disc when pressure from the pull chamber exceeds a certain threshold pressure.

Preferably the rupturable discs are sealed with their flanges against the respective bushing ends, e.g. by a weld.

In one possible embodiment the shoulder in the bore in the piston has an inner edge and the rupturable disc on the push side of the bushing rests with its outer flange against the shoulder, such that the disc, when pressurized from the pull side of the cylinder after the pull sided disc has ruptured, inverts the dome shape and the disc engages the inner circumferential edge, wherein preferably the inner edge of the shoulder is rounded with a radius, which corresponds to a pressure at which the disc ruptures, which pressure is lower than the threshold pressure at which the pull sided disc ruptures.

In another possible embodiment the disc on the push side is not ruptured itself after the pull sided disc is ruptured during a collision, but the sealing weld between the push sided disc and the bushing is ruptured.

The bushing may have an inner surface and an end face on either end, wherein in the respective end faces an annular recess is provided which surrounds the bore of the bushing such that respective shoulders are formed in the bushing, and wherein the respective rupturable discs are arranged with their flanges against said respective shoulders in the bushing.

The invention also relates to a tilting system for tilting a cab of a vehicle according to claim 9.

Furthermore the invention relates to a double acting hydraulic tilt cylinder for tilting a cab of a vehicle according to claim 10.

The invention will be described in more detail with reference to the drawings.

BRIEF DESCRIPTION OF THE DRAWINGS

FIG. 6 shows in a sectional view an alternative embodiment of a hydraulic tilting cylinder according to the invention;

FIG. 7 shows in a sectional view another alternative embodiment of a hydraulic tilting cylinder according to the invention, FIG. 8 shows in a sectional view yet another alternative embodiment of a hydraulic tilting cylinder according to the invention.

DETAILED DESCRIPTION

Figure 1:
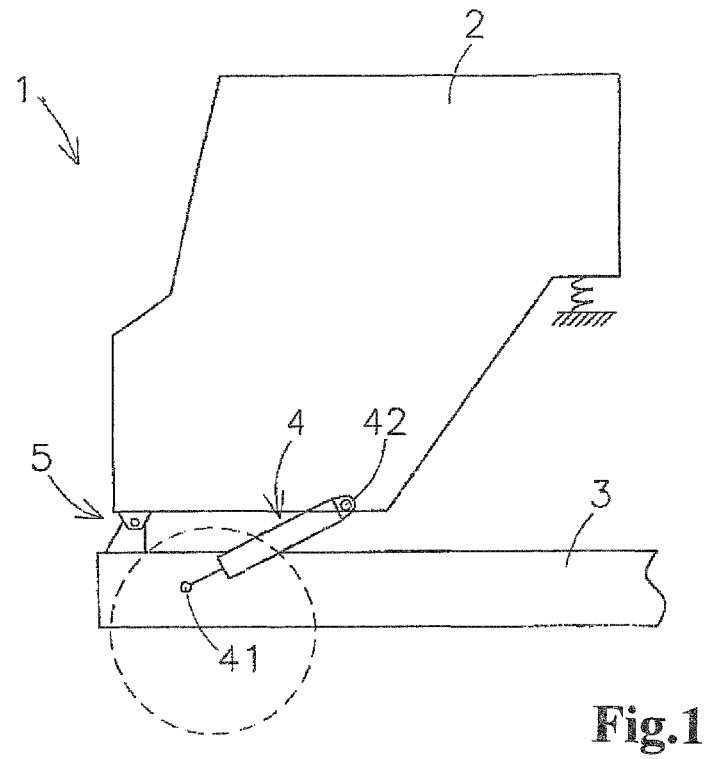
FIG. 1 shows a vehicle with a tilt cab and a hydraulic tilt cylinder.

In FIG. 1 is shown in a schematic way a front part of a vehicle 1 like a lorry. The vehicle 1 has a cab 2 which is mounted on a chassis 3. The cab 2 is pivotably mounted at 5 to the chassis 3. A hydraulic tilt cylinder 4 is mounted with one end to the chassis 3 and with the other end to the cab 2, such that when the length of the tilt cylinder is increased, the cab 2 will be tilted from a lowered position, as is shown in FIG. 1, to a raised position.

The hydraulic tilt cylinder 4 has a front connection point 41 which is connected to the chassis 3 and a rear connection point 42 which is connected to the cab 2. In FIG. 1 the front connection point 41 may be constituted by an attachment eyelet on the end of the piston rod and the rear connection point 42 may be constituted by an eyelet on the cylinder body. However, the front connection point may alternatively be constituted by an attachment eyelet on the cylinder body and the rear connection point may be constituted by an attachment eyelet on the end of the piston rod, as long as the front connection point is connected to the chassis 3 and the rear connection point is connected to the cab 2, such that when the cab 2 is forced in a rear direction during a frontal collision, the cab 2 tries to pull the piston/piston rod assembly out of the cylinder body towards an extracted state.

Figure 2:
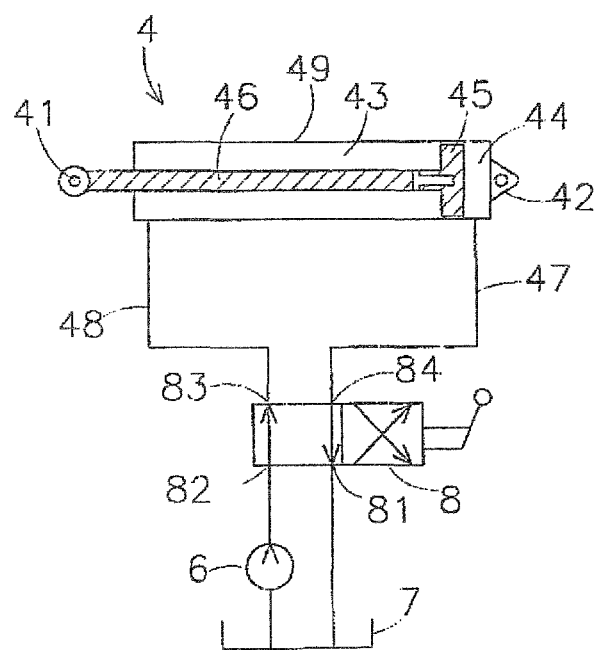
FIG. 2 shows in a schematic view a hydraulic tilting system for tilting the tilt cab of FIG. 1.

In FIG. 2 is shown a schematic view of a tilt system for tilting the cab 2. The tilt system comprises a pump 6, a reservoir 7 for hydraulic fluid, the mentioned tilt cylinder 4 and a control valve 8.

The tilt cylinder 4 is a cylinder of the so called double-acting type, which comprises a cylinder body 49, in which a pull chamber 43 and a push chamber 44 are defined by a movable piston 45. A piston rod 46 is connected to the piston 45. The push chamber 44 has a push connection to which a hydraulic line 47 is connected, which is connected to the control valve 5. The pull chamber 43 has a pull connection to which a hydraulic line 48 is connected which is connected to the control valve 5.

The control valve 8 is in the shown embodiment a hand operated two position valve. It is however also possible to have an electrically operated valve. The valve 8 has four ports. A first port 81 is connected to the reservoir 7. A second port 82 is connected to the pump 6. A third port 83 is connected to the pull chamber 43 and a fourth port 84 is connected to the push chamber 44.

In a first position of the valve, which is illustrated in the figure, the second port 82 is connected with the third port 83, and the first port 81 is connected to the fourth port 84. In this situation the pull chamber 43 is under pressure and the push chamber 44 is connected to the reservoir and thus pressureless.

In a second position of the valve the second port 82 is connected to the fourth port 84 and the first port 81 is connected to the third port 83. In this situation the push chamber 44 is connected to the pump, and the pull chamber is pressureless.

Figure 3:
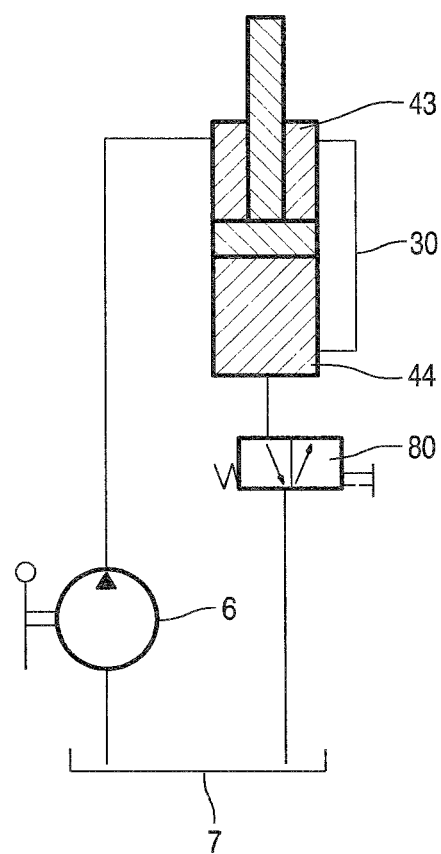
FIG. 3 shows in a schematic view an alternative hydraulic tilting system for tilting the tilt cab of FIG. 1.

In FIG. 3 an alternative hydraulic system for tilting the cab 2 is shown. In this system, the cylinder works with the regenerative principle and the push chamber and pull chamber are interconnected by a bypass line 30. In this embodiment a two position control valve 80 with three ports is provided.

The hydraulic tilting systems shown in FIGS. 2 and 3 are merely included in the drawings and description for illustrative purposes and should not be considered as limiting. Also other hydraulic tilting systems are possible which will be known to a person skilled in the art.

Under normal operation conditions when the cab 2 has to be tilted, the operating person will operate the valve 8, 80 to bring the push chamber 44 in connection with the pump 6. In this way the piston/piston rod assembly will be pushed out and the cab 2 will be tilted. When the cab 2 has to be lowered again, the control valve 8, 80 is switched to a position in which the push chamber 44 is connected to the reservoir 7 as a result of which the push chamber 44 is pressureless and the piston/piston rod assembly is pulled in, driven by gravity and/or hydraulic pressure from the pump 6.

Figure 4:
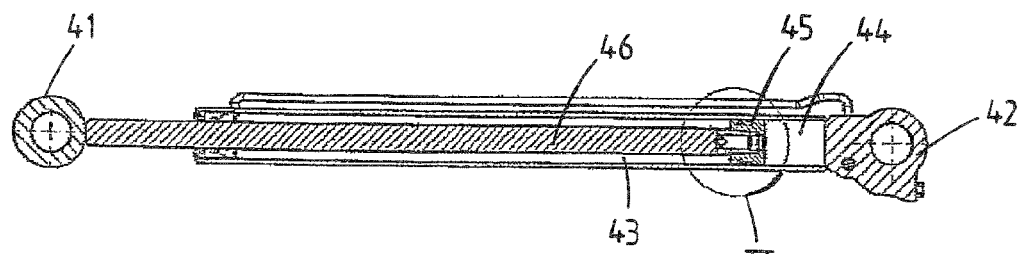
FIG. 4 shows in a sectional view a preferred embodiment of a hydraulic tilt cylinder according to the invention.
Figure 5:
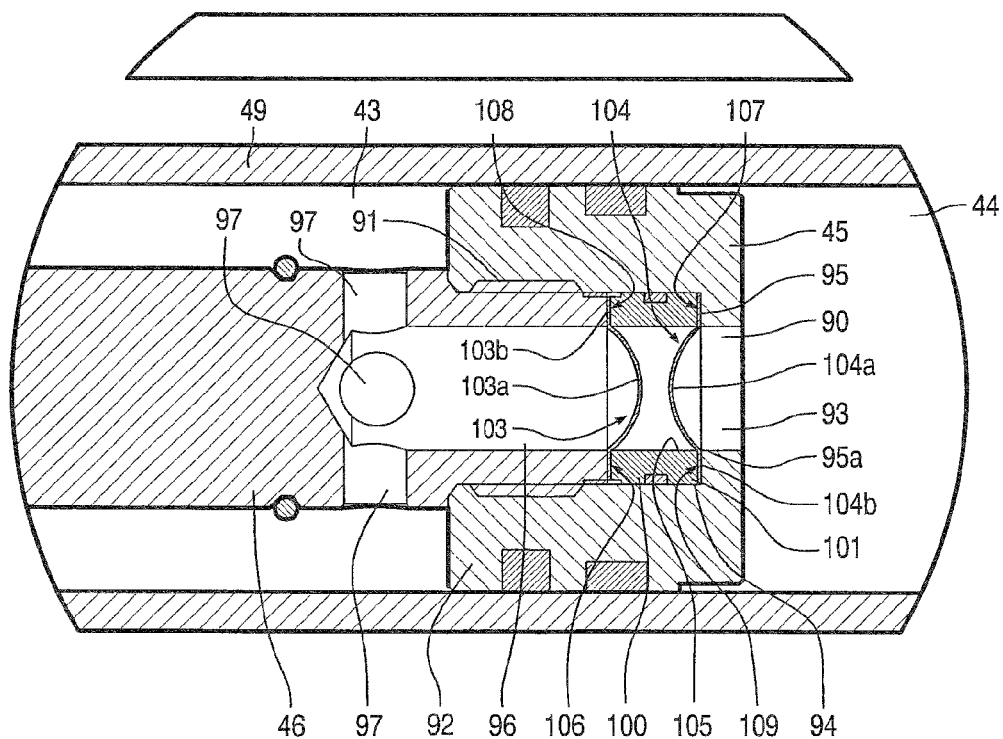
FIG. 5 shows in a sectional view a detail indicated in FIG. 4 with V.

FIGS. 4 and 5 show in more detail a hydraulic cylinder 4 according to the present invention. In the hydraulic cylinder 4 a safety release device is incorporated as will be described below.

In FIG. 5 is visible that the piston 45 is provided with an axial through bore 90, which extends in axial direction form the push sided end to the opposite pull sided end of the piston 45. The through bore 90 has a portion on the pull chamber end which is provided with an inner screw thread 91. The piston rod 46 has an end portion 92 which is provided with an outer screw thread. The piston rod 46 is connected to the piston 45 by screwing the end portion 92 in the threaded portion 91 of the bore 90.

The bore 90 has an end portion 93 on the push side which is in open communication with the push chamber 44. Between the end portion 93 and the threaded portion 91 of the bore 90 an intermediate bore portion 94 is present. The end bore portion 93 has a smaller diameter than the intermediate bore portion 94 such that between the bore portions 93 and 94 a shoulder 95 is formed.

In the piston rod 46 an axial bore 96 is provided in the end portion 92, which bore 96 extends from the end face of the piston rod 46 beyond the face of the pull sided face of the piston. One or more radial bores 97 are provided in the piston rod 46 which extend from the outer surface of the piston rod 46 to the axial bore 96. The radial bores 97 bring the axial bore 96 in fluid communication with the pull chamber 43 of the cylinder 4.

In the intermediate bore portion 94 in the piston 45 a by pressure removable element or rupturable element 100 is arranged. The rupturable element 100 is arranged against the shoulder 95 and is confined in the intermediate bore portion 94 by the end face of the piston rod 46 which is screwed in the piston 45.

The rupturable element 100 closes of the passage from the pull chamber 43 to the push chamber 44 through the piston rod 46 and the piston 45, which passage comprises the radial bores 47 and the axial bore 96 in the piston rod 46 and the intermediate bore portion 94 and the end bore portion 93 in the piston 45.

The rupturable element 100 comprises a bushing 101 in which in the outer surface a circumferential groove is provided in which a sealing ring 102 is provided. The sealing ring 102 engages in a sealing manner the surface of the intermediate bore 94.

The bushing 100 has an inner surface 105 and an end face 106, 107 on either end. A circumferential edge 108, 109 respectively, is formed in the transition from each end face 106, 107 and the inner surface 105.

The rupturable element 100 comprises furthermore a pair of rupturable discs 103 and 104 respectively. The rupturable disc 103 on the pull side has a dome shaped central region 103a and an outer flange 103b which lies in engagement with the face of the bushing 101. The concave side of the dome shaped central region 103a is facing the bore 96 in the piston rod. The rupturable disc 104 on the push side also has a dome shaped central region 104a and an outer flange 104b which lies in engagement with the opposite end face of the bushing 101. The concave side of the dome shaped central region 104a is facing the bore portion 90 in the piston.

The rupturable discs 103 and 104 are preferably made of a metal foil.

Each of the mentioned edges 108 and 109 has a rounded shape with a radius, which is such that under normal operation pressures for tilting the cab 2, the rounded edges 108, 109 support the respective rupturabe discs 103, 104. The radius on the pull sided edge 108 of the bushing 100 is such that it ruptures the pull sided disc 103 when pressure from the pull chamber 43 exceeds a certain threshold pressure.

The shoulder 95 has an inner edge 95a and the rupturable disc 104 on the push side of the bushing 100 rests with its outer flange 104b against the shoulder 95. The inner edge 95a of the shoulder 95 is rounded with a radius. The rupturable disc 104, when pressurized from the pull side of the cylinder 4 after the pull sided disc 103 has ruptured, inverts the dome shape of the central region 104a and the disc 104 engages the inner circumferential edge 95a. The radius of the inner edge 95a is such that the edge initiates the rupturing of the deformed disc 104. The pressure at which the disc 104 ruptures is lower than the threshold pressure at which the pull sided disc 103 ruptures. Thereby is guaranteed that the when the pull sided disc 103 ruptures, the push sided disc 104 wil almost instantly rupture as well and the release passage from the pull chamber 43 to the push chamber 44 is opened.

Under normal operating conditions the pressure in the pull chamber 43 and the push chamber 44 are such that the threshold pressure at which the respective discs 103 and 104 is not exceeded.

In the event of an accident with the vehicle, in particular a frontal collision, the cab 2 will be in the lowered position. The piston/piston rod assembly is in the pushed in state in the cylinder body. The collision pushes the cab 2 in rearward direction with respect to the chassis 3. The cab 2 thus tries to pull the piston/piston rod assembly out of the cylinder body 49 with a high velocity. As a result the pressure in the pull chamber 43 increases rapidly, because the hydraulic fluid is to be considered incompressible. When the pressure in the pull chamber exceeds the threshold pressure the rupturable disc 103 will rupture and almost instantly thereafter the push sided disc 104 will rupture as well. The release passage is now open whereby hydraulic fluid can flow from the pull chamber 43 to the push chamber 44 and the piston/piston rod assembly can be pulled out of the cylinder body 49. Thereby the cab 2 is allowed to move rearwardly with respect to the chassis 3. In this way it is prevented that the cab 2 will be crushed and the risk of serious injury of the driver is reduced.

Figure 9:
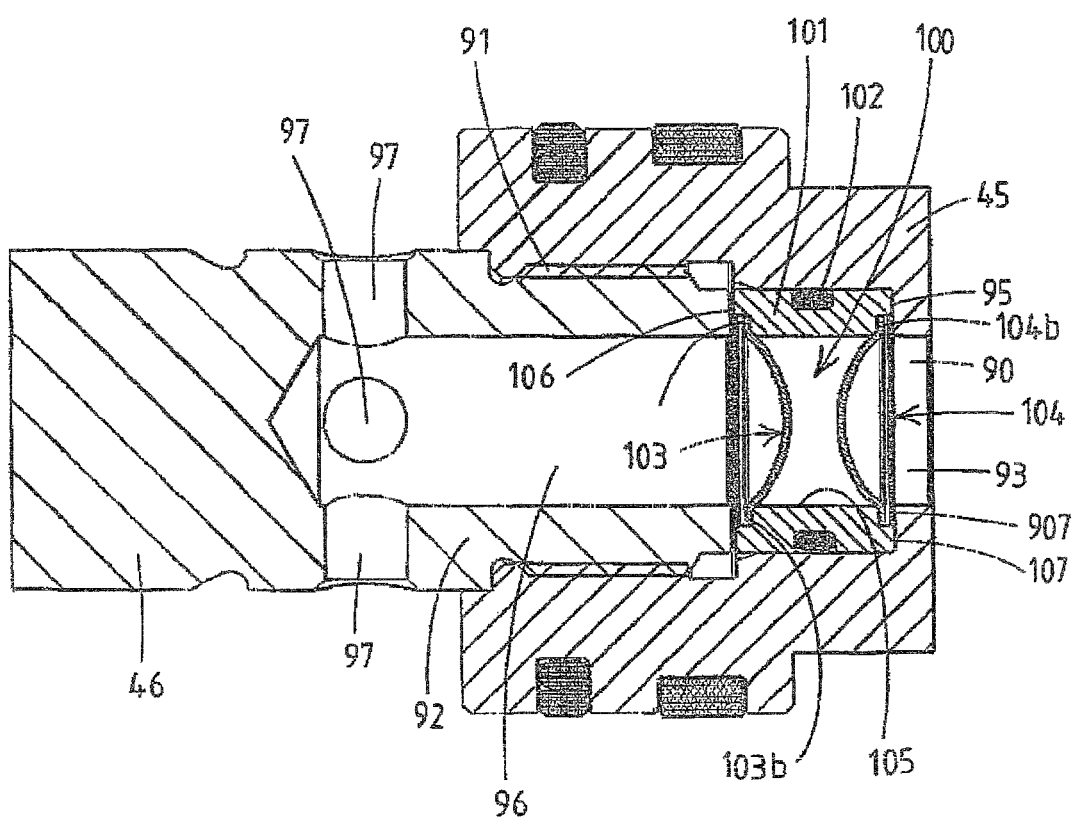
FIG. 9 shows in a sectional view an alternative piston/piston rod assembly for the tilting cylinder of FIG. 4.

In FIG. 9 is shown another piston/piston rod assembly for the tilt cylinder. In this piston/piston rod assembly features corresponding to the features in FIG. 5 have corresponding reference numerals. The difference between the embodiment shown in FIG. 5 and the embodiment of FIG. 9 is that in FIG. 9 the bushing 101 has annular recess 906, 907 in the end faces 106 and 107 surrounding the bore 96 of the bushing 101. The rupturable discs 103 and 104 are arranged in those recesses 906 and 907 with their flanges 103b, 104b. The circumferential edge between the recesses 906, 907 and the bore 96 may be rounded, but may also be sharp.

In the embodiment of FIG. 9 the discs 103 and 104 sealed, preferably welded, with their flanges in the recesses 906, 907. When in use the disc 103 on the pull side ruptures due to the pressure in the pull chamber exceeding the threshold pressure, the disc 104 on the push side may not be ruptured itself, but the sealing weld between the push sided disc and the bushing is ruptured. Of course also the disc 104 on the push side may be such that it itself ruptures due to the pressure load from the pull side. In either way the pull chamber and push chamber are interconnected to release the pressure.

The space between the rupturable discs 103 and 104 in FIGS. 5 and 9 is substantially pressureless. Thereby the rupturable elements 100 can be used in a hydraulic system as is shown in for example in FIG. 2, wherein one of the chambers 43, 44 is pressureless, but can also be used in a hydraulic system as is shown for example in FIG. 3 which works with the so called regenerative principle, thus with both chambers 43, 44 having a same pressure during operation.

The rupturable element 100 (FIGS. 5 and 9) is preferably symmetrical, such that during assembly no mistakes can be made with the orientation of the rupturable element 100.

In FIG. 6 is shown another tilting cylinder 204, in which the safety release device is not incorporated in the piston/piston rod assembly as is shown in FIGS. 4 and 5. The cylinder 204 is provided to a bypass conduit 205 located outside the cylinder body. In the bypass conduit a rupturable element 206 is provided. This rupturable element 206 may be the same as the rupturable element 100 as is described with reference to FIGS. 4 and 5.

In FIG. 7 is shown a piston/piston rod assembly of a hydraulic tilting cylinder according to the invention. This piston and piston rod assembly has a safety release device incorporated in it. The piston 70 is arranged on the piston rod 71, such that the latter extends through the piston 70. The safety release device comprises an axial bore 73 in the piston rod 72, which extends from the end face 74 of the rod 72 to a location beyond the pull sided face of the piston 70. One or more radial bores 75 are provided in the piston rod 71 which extend from the outer surface of the piston rod to the axial bore 73. The radial bores 75 bring the axial bore 73 in fluid communication with the pull chamber of the cylinder.

In the axial bore 73 a ball 76 is arranged which fits tightly in the bore 73. The ball 76 closes off the passage between the pull side and the push side of the tilt cylinder and is held in the bore 73 such that under normal operation conditions the ball stays in the bore. In the event of a collision when a certain threshold pressure is exceeded in the pull sided chamber of the cylinder, the ball is ejected from the bore 73 and the passage between the pull chamber and the push chamber is released.

In FIG. 8 is shown an alternative of the embodiment of FIG. 7. In this alternative embodiment a cylindrical body 77 is tightly fitted in the bore 73 instead of the ball 76. This embodiment essentially functions the same as the one shown in FIG. 7.

What is claimed is:

1. A vehicle comprising a chassis and a tilt cab which is mounted to said chassis and is tiltable with respect to the chassis, the vehicle furthermore comprising a tilting system for tilting said tilt cab relative to the vehicle chassis back and forth between a lowered position and a raised position, said tilting system comprising: a reservoir for hydraulic fluid; a pump; at least one double-acting hydraulic tilt cylinder having a push chamber and a pull chamber and a movable piston and piston rod assembly, wherein the piston separates the push chamber and the pull chamber, said hydraulic cylinder being connected to the chassis and to the cab, such that when hydraulic fluid is supplied to the push chamber the cab moves to the raised position and when hydraulic fluid is supplied to the pull chamber the cab moves to the lowered position; and a control valve, which in a first position connects the pump to the push chamber of the cylinder and connects the reservoir to the pull chamber, and in a second position connects the pump to the pull chamber of the cylinder and the reservoir to the push chamber, wherein the tilt cylinder has a safety release device, which releases pressure from the pull chamber side to the push chamber side of the tilting system, in the event that the pressure in the pull chamber exceeds a predetermined threshold pressure, wherein the safety release device includes a release passage extending between the pull chamber and the push chamber, in which release passage a by pressure removable element is arranged, wherein the release passage brings the pull chamber in fluid communication with the push chamber when the by pressure removable element is removed to open the release passage.

2. The vehicle according to claim 1, wherein the pressure removable element is a rupturable element.

3. The vehicle according to claim 2, wherein the release passage is incorporated integrally in the tilt cylinder.

4. The vehicle according to claim 2, wherein the release passage is constituted by a conduit arranged externally on the cylinder.

5. The vehicle according to claim 3, wherein the release passage extends through the piston/piston rod assembly.

6. A vehicle comprising a chassis and a tilt cab which is mounted to said chassis and is tiltable with respect to the chassis, the vehicle furthermore comprising a tilting system for tilting said tilt cab relative to the vehicle chassis back and forth between a lowered position and a raised position, said tilting system comprising: a reservoir for hydraulic fluid; a pump; at least one double-acting hydraulic tilt cylinder having a push chamber and a pull chamber and a movable piston and piston rod assembly, wherein the piston separates the push chamber and the pull chamber, said hydraulic cylinder being connected to the chassis and to the cab, such that when hydraulic fluid is supplied to the push chamber the cab moves to the raised position and when hydraulic fluid is supplied to the pull chamber the cab moves to the lowered position; and a control valve, which in a first position connects the pump to the push chamber of the cylinder and connects the reservoir to the pull chamber, and in a second position connects the pump to the pull chamber of the cylinder and the reservoir to the push chamber, wherein the tilt cylinder has a safety release device, which releases pressure from the pull chamber side to the push chamber side of the tilting system, in the event that the pressure in the pull chamber exceeds a predetermined threshold pressure, wherein an axial through bore is provided in the piston, in which through bore an end portion of the piston rod is inserted, the end portion of the piston rod is provided with an axial bore, which extends from the piston rod end surface, and the piston rod is provided with at least one radially extending bore which extends from the outer surface of the piston rod to said axial bore of the piston rod, wherein the axial bore in the piston and the axial and radial bore in the piston rod define the release passage.

7. The vehicle according to claim 6, wherein a shoulder is formed in the bore in the piston, the rupturable element rests with one side thereof against said shoulder, and the end surface of the piston rod rests against the opposite side of the rupturable element, such that the rupturable element is confined between the shoulder and said end surface of the piston rod.

8. A vehicle comprising a chassis and a tilt cab which is mounted to said chassis and is tiltable with respect to the chassis, the vehicle furthermore comprising a tilting system for tilting said tilt cab relative to the vehicle chassis back and forth between a lowered position and a raised position, said tilting system comprising: a reservoir for hydraulic fluid; a pump; at least one double-acting hydraulic tilt cylinder having a push chamber and a pull chamber and a movable piston and piston rod assembly, wherein the piston separates the push chamber and the pull chamber, said hydraulic cylinder being connected to the chassis and to the cab, such that when hydraulic fluid is supplied to the push chamber the cab moves to the raised position and when hydraulic fluid is supplied to the pull chamber the cab moves to the lowered position; and a control valve, which in a first position connects the pump to the push chamber of the cylinder and connects the reservoir to the pull chamber, and in a second position connects the pump to the pull chamber of the cylinder and the reservoir to the push chamber, wherein the tilt cylinder has a safety release device, which releases pressure from the pull chamber side to the push chamber side of the tilting system, in the event that the pressure in the pull chamber exceeds a predetermined threshold pressure, wherein the safety device includes a by pressure removable element, wherein the by pressure removable element is a rupturable element, and wherein the rupturable element comprises one rupturable disc or more rupturable discs in series.

9. The vehicle according to claim 8, wherein the rupturable element comprises a bushing, wherein on either end of the bushing a rupturable disc is arranged.

10. The vehicle according to claim 8, wherein at least one of the rupturable discs has a dome shaped central portion and a radial outer flange.

11. The vehicle according to claim 8, wherein the at least one rupturable disc is made of a metal foil.

12. The vehicle according to claim 9, wherein there are two rupturable discs, and the rupturable discs both have a dome shaped central portion with a convex side and a concave side, wherein the dome shaped portions of the rupturable discs are facing each other with the convex side thereof.

13. The vehicle according to claim 12, wherein the bushing has an inner surface and an end face on either end, wherein an edge is present between each end face and the inner surface, each edge having a rounded shape with a certain radius, which is such that under normal operating conditions for tilting the cab the rounded edges support the respective rupturable discs, and wherein the radius on the pull sided edge of the bushing is such that it ruptures the pull sided disc when pressure from the pull chamber exceeds a certain threshold pressure.

14. The vehicle according to claim 13, wherein a shoulder is formed in the bore in the piston, the rupturable element rests with one side thereof against said shoulder, and the end surface of the piston rod rests against the opposite side of the rupturable element, such that the rupturable element is confined between the shoulder and said end surface of the piston rod, wherein the shoulder has an inner edge and the rupturable disc on the push side of the bushing rests with its outer flange against the shoulder, such that the disc, when pressurized from the pull side of the cylinder after the pull sided disc has ruptured, inverts the dome shape and the disc engages the inner circumferential edge.

15. The vehicle according to claim 14, wherein the inner edge of the shoulder is rounded with a radius, which corresponds to a pressure at which the disc ruptures, which pressure is lower than the threshold pressure at which the pull sided disc ruptures.

16. The vehicle according to claim 1, wherein the hydraulic cylinder has a cylinder body which is coupled to the vehicle chassis and the piston rod is coupled to the tiltable cab, wherein, in the lowered state of the cab, the cylinder body is located in driving direction of the vehicle in front of the end of the piston rod.

17. A tilting system for tilting a cab of a vehicle comprising: a reservoir for hydraulic fluid; a pump; at least one double-acting hydraulic tilting cylinder having a push chamber and a pull chamber and a movable piston and piston rod assembly, which separates the push chamber and the pull chamber, wherein the tilting cylinder is connected to the chassis and to the cab, such that when hydraulic fluid is supplied to the push chamber the cab moves to the raised position and when hydraulic fluid is supplied to the pull chamber the cab moves to the lowered position; and a control valve, which in a first position connects the pump to the push chamber of the cylinder and the reservoir to the pull chamber, and in a second position connects the pump to the pull chamber of the cylinder and the reservoir to the push chamber, wherein the tilt cylinder has a safety release device, which releases pressure from the pull chamber side to the push chamber side of the tilting system, in the event that the pressure in the pull chamber exceeds a predetermined threshold pressure, wherein the safety release device includes a release passage extending between the pull chamber and the push chamber, in which release passage a by pressure removable element is arranged, wherein the release passage brings the pull chamber in fluid communication with the push chamber when the by pressure removable element is removed to open the release passage.

18. A double acting hydraulic tilt cylinder for tilting a cab of a vehicle, having a push chamber and a pull chamber and a movable piston and piston rod assembly, wherein the piston separates the push chamber and the pull chamber, wherein the tilt cylinder is connected to the chassis and to the cab, such that when hydraulic fluid is supplied to the push chamber the cab moves to the raised position and when hydraulic fluid is supplied to the pull chamber the cab moves to the lowered position; wherein an axial through bore is provided in the piston, in which through bore an end portion of the piston rod is inserted, the end portion of the piston rod is provided with an axial bore, which extends from the piston rod end surface, and the piston rod is provided with at least one radially extending bore which extends from the outer surface of the piston rod to said axial bore of the piston rod, wherein the axial bore in the piston and the axial and radial bore in the piston rod define a release passage between the pull chamber and the push chamber; wherein a shoulder is formed in the bore in the piston, a rupturable element resting with one side thereof against said shoulder, and the end surface of the piston rod rests against the opposite side of the rupturable element, such that the rupturable element is confined between the shoulder and said end surface of the piston rod.

19. The hydraulic cylinder according to claim 18, wherein the rupturable element comprises a bushing, wherein at either end of the bushing a rupturable disc is arranged.

20. The hydraulic cylinder according to claim 19, wherein the rupturable disc has a dome shaped central portion and a radial outer flange.

21. The hydraulic cylinder according to claim 19, wherein the rupturable disc is made of a metal foil.

22. The hydraulic cylinder according to claim 19, wherein there are two rupturable discs, and the rupturable discs both have a dome shaped central portion with a convex side and a concave side, wherein the dome shaped portions of the rupturable discs are facing each other with the convex side thereof.

23. The hydraulic cylinder according to claim 22, wherein the bushing has an inner surface and an end face on either end, wherein an edge is present between each end face and the inner surface, each edge having a rounded shape with a certain radius, which is such that under normal operation conditions for tilting the cab (pressures) the rounded edges support the respective rupturable discs, and wherein the radius on the pull sided edge of the bushing is such that it ruptures the pull sided disc when pressure from the pull chamber exceeds a certain threshold pressure.

24. The hydraulic cylinder according to claim 18, wherein the shoulder in the bore in the piston has an inner edge and the rupturable disc on the push side of the bushing rests with its outer flange against the shoulder, such that the disc, when pressurized from the pull side of the cylinder after the pull sided disc has ruptured, inverts the dome shape and the disc engages the inner circumferential edge.

25. The hydraulic cylinder according to claim 24, wherein the inner edge of the shoulder is rounded with a certain radius, which radius corresponds to a pressure at which the disc ruptures, which pressure is lower than the threshold pressure at which the pull sided disc ruptures.

26. The hydraulic cylinder according to claim 22, wherein the bushing has an inner surface and an end face on either end, wherein in the respective end faces an annular recess is provided which surrounds the bore of the bushing such that respective shoulders are formed in the bushing, and wherein the respective rupturable discs are arranged with their flanges against said respective shoulders in the bushing.

* * * * *